Nov. 1, 1960 V. FLAX 2,958,169
METHOD OF FILLING PLASTIC CONTAINERS WITH FLUID MATERIAL
Filed March 5, 1953
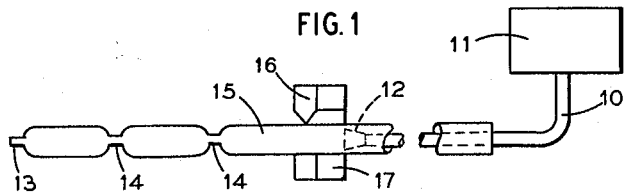
FIG. 1
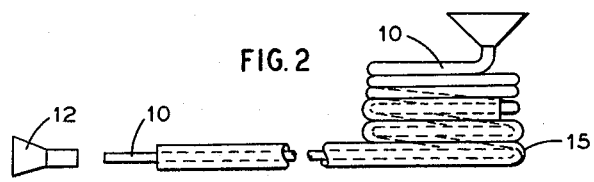
FIG. 2
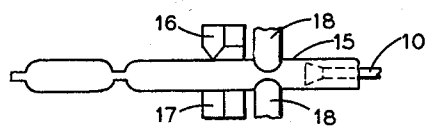
FIG. 3
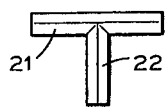
FIG. 4
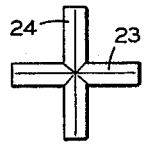
FIG. 5
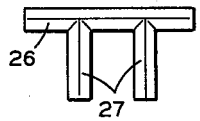
FIG. 6
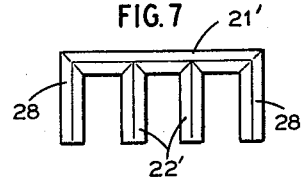
FIG. 7
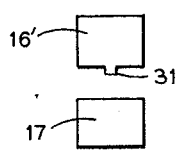
FIG. 8
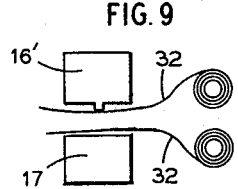
FIG. 9
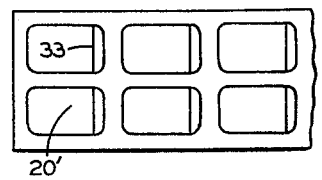
FIG. 10
FIG. 11
INVENTOR.
Valer Flax
BY
ATTORNEY 2,958,169

METHOD OF FILLING PLASTIC CONTAINERS WITH FLUID MATERIAL

Valer Flax, Place Nahomme, Vic-Fezance, France

Filed Mar. 5, 1953, Ser. No. 340,657

2 Claims. (Cl. 53—37)

This invention relates to the production of containers filled with fluid material by welding together at spaced intervals the walls of a tube of flexible thermoplastic material. The fluid filling material may be a liquid, a paste or other semi-fluid material, or air or other gas. The tube of flexible thermoplastic material from which the individual containers are produced may be formed by extrusion, or by sealing together the longitudinal edges of one or more strips.

The invention comprises an improved process for the production of such fluid-filled containers according to which a tube of flexible thermoplastic material is passed over a supply tube and then filled progressively along its length with fluid delivered into it through the supply tube, the thermoplastic tube being withdrawn over the delivery end of the supply tube as it is filled with fluid and divided into a plurality of separate containers by pressing and welding together the walls of the thermoplastic tube, the successive welds being formed progressively along the length of the tube as it is filled.

The process of the invention may be carried out in many different ways and the examples given below are not to be regarded as limiting the scope of the invention. In particular, the shapes and dispositions of the areas over which the opposite walls of the tube are welded together may be varied as required in order to produce containers of any desired form.

The supply tube may itself be of flexible construction, or may be sufficiently rigid to retain its form throughout the process. In the latter case it is preferably given a helical or other suitable coiled form over the greater part of the length, so that long lengths of the thermoplastic tube can be employed without making the overall dimensions of the apparatus inconveniently large.

Conveniently the supply tube is permanently connected at the end remote from its delivery end to a storage reservoir for the fluid filling material. The filling material may be delivered into and through the supply tube by gravity flow, by pumping, by the application of gaseous pressure, or by means of an endless screw feed.

The thermoplastic tube may be closed at its outer end before threading it over the supply tube, the closed end being brought close to the delivery end of the supply tube before filling is begun. More conveniently, however, the thermoplastic tube is left open at both ends until after it has been threaded over the supply tube and is then closed close to the delivery end of the supply tube. By proceeding in the latter way the supply tube may be made of such cross-section as to pass easily through the thermoplastic tube, the entire length of which is first passed over the supply tube, after which a delivery nozzle which is a close fit within the thermoplastic tube is attached to the delivery end of the supply tube, the outer end of the thermoplastic tube is withdrawn over the nozzle and the tube is sealed close to the nozzle. The withdrawal of the thermoplastic tube from the supply tube is preferably effected by the delivery into it from the supply tube of filling fluid under pressure and in this case it is necessary that the delivery end at least of the supply tube should be a close fit within the thermoplastic tube.

The welds which are formed sequentially along the length of the thermoplastic tube to divide it into separate containers may be formed at a position quite close to the delivery end of the supply tube, so that the length of filled tube between the end of the supply tube and the last formed weld will never greatly exceed the distance between successive welds. However, the welding position may be at any convenient distance from the end of the supply tube.

In certain cases, particularly where there is a substantial length of filled tube between the delivery end of the supply tube and the welding position, difficulty may be experienced in avoiding variations in the volume of fluid enclosed in the individual containers. Such variations are generally undesirable and may be a matter for serious concern in such cases as the packaging of individual doses of liquid medicaments.

Variations in the capacity of the individual containers may be reduced or substantially eliminated if a filled length of the tube, already closed at one end by welding, is temporarily isolated from the remainder of the tube by clamping the opposite walls together, and the walls of the tube are then pressed into engagement and welded together at a point intermediate the first mentioned weld and the clamping point, after which the clamping pressure is released and the length of tube following the newly formed weld is refilled with the fluid material.

When this method is adopted, the fluid in the isolated length of tubing cannot flow back past the clamping point during the welding operation. The pressing together of the walls of the tube at the welding point consequently raises the pressure in the isolated length above that existing in the remainder of the tube and this increased pressure (and consequent increased tension in the walls of the tube) is permanently maintained in the newly formed containers when they are sealed off by welding. The pressure thus produced is, however, completely independent of the length or other characteristics of the tube beyond the clamping point and is determined solely by the characteristics of the relatively short isolated length of tubing, which can far more easily be maintained constant for each successive welding operation. Other things being equal, the pressure produced within the sealed containers will be dependent upon the length of the isolated sector. To avoid excessive pressures this length should be at least 30% greater than the distance between successive welds, but it should not exceed about 20 times that distance.

It will be appreciated that the temporary clamping together of the walls of the tube completely displaces the fluid out of a length of the tube corresponding to the length of the clamping jaws, which may be equal to or greater than the length between successive welds. When the clamping jaws are opened after the formation of the weld, this temporarily emptied section of the tube is automatically refilled by a return flow of fluid from the supply tube.

The thermoplastic tube may in known manner be divided by transverse weld lines to form a single series of containers joined end to end, the cross section of the initial tube being that required in the finished containers and each successive welding operation producing only a single container. Alternatively, the tube may be welded both along transverse lines and along one or more longitudinal lines, so as to divide it into sections joined together end to end and each sub-divided into two or more containers joined together side by side. This latter method forms the subject of my co-pending application for Letters Patent Serial No. 340,656 and has the advantages that tube stock of relatively large cross-section may be used for the production of containers of small cross-section; tube stock of the same cross-section may be used for the production of containers of different cross-sectional sizes, by varying the number of containers formed side by side in each section of the tube; and two or more containers may be formed at each welding operation.

When proceeding in this way it is preferable that the welds effected successively along the length of the tube are each of such form as to divide a still unclosed part of the tube into two or more pockets and to close the open ends of the pockets formed by the previous weld. The pockets formed may have the full length of the required containers. Thus, if two containers are to be formed side by side, the welding tools used may have the general form of the letter T, the stem of the T dividing a short length of the tube along a central longitudinal line into two pockets, while the cross bar divides the tube transversely across its full width at the mouths of the two pockets formed during the previous welding operation. Alternatively, the pockets formed may have only a part of the full length of the required containers, the remaining parts of the longitudinal margins of the containers being formed simultaneously with the transverse weld closing these containers. Thus, when two containers are formed side by side, the welding tools may have the general form of a cross (with either equal or unequal arms) rather than that of a T.

If three or more containers are to be formed side by side, it is only necessary to provide the welding tools with two or more longitudinally extending portions instead of with only one such portion. If desired, the welding tools may include longitudinally extending portions which engage the tube at its edges, so that both side margins of all the containers will be formed by welded areas and all the containers produced will have the same form.

It is to be remarked that the references above and below to the length and sides of the containers are to be understood as referring only to the dimensions of the containers which extend longitudinally of the tube and not as implying that the individual containers necessarily have their greatest dimensions disposed in this direction.

When it is desired to produce cushion shaped containers of more or less rectangular outline, the welding tools may consist simply of a number of straight sections of constant width. However, by appropriately shaping the welding tools, containers of almost any desired form may be produced, including in particular containers provided with a shoulder and neck. Such a neck may be formed as desired at the ends, or at the sides, or at the corners of the containers.

The tube engaging surfaces of the welding tools may both be flat, as has been the case in previously known processes of the general character here in question, the individual containers being separated from one another by cutting through the center of the welded areas which separate them. However, it is an advantage if the welding together of the walls of the tube is effected while the walls are pressed together between a pair of tools, one at least of which has its tube-engaging surface formed with a projecting rib extending longitudinally of a part or the whole of the weld and of less width than the welded area, so that the weld produced is formed with a groove or line of weakness which facilitates subsequent separation of the containers from one another. Conveniently, the tube-engaging surface of one tool is flat and that of the other is of substantially V-section, the material of the tube which is displaced by the local reduction in thickness of the contacted tube walls bulging into the interior of the containers divided by the weld and thickening their walls adjacent the line of the weld.

Such grooving or thinning of the welded web between two containers is of particular advantage in the case of the longitudinal welds, as the separation by cutting of the containers which are formed side by side in the tube presents practical difficulties, whereas when the longitudinally extending welded areas are weakened in this way, the containers may easily be torn apart. However, the grooving or thinning may be applied alternatively or in addition to the transversely extending welded areas in any case where this offers advantages.

The risk of fire during the production of containers filled with inflammable fluid may be reduced by interposing between the walls of the tube and the tools by which they are pressed together to effect welding thin, very flexible sheets of a material which is a bad conductor of electricity, does not contain molecules of free carbon and has a melting point above 100 degrees C. The interposed sheets may suitably consist of a fabric formed from glass fibres and impregnated with silicon rubber. Thin flexible sheets of polytetrafluorethylene are also suitable for this purpose. The interposed sheets should be so flexible as not to interfere with the correct shaping of the container by the combined action of the pressure within the tube and the externally applied tools.

The interposed sheets may with advantage have a rough surface texture, which is impressed upon the surface of the welded portions of the tube, when these are softened during the welding operation. The roughened surface thus produced on the welded margin facilitates the eventual tearing open of the container by enabling a better grip to be obtained upon it. When the interposed sheets are of woven construction, the weaving pattern may constitute the desired surface roughness. In other cases the sheets may be provided in any suitable manner with ribs, or other irregularities following any desired pattern.

When the containers are filled with a pasty or semi-liquid material, they may be formed after filling and sealing with delivery apertures by cutting a slit in the wall of the container close and parallel to one of the welds closing the container. The slit may be quite short and will not ordinarily exceed 15 mm. in length.

When such a container is squeezed, the increased pressure of the contents forces apart the lips of the slit so that some of the contents are extruded from the container. When the squeezing pressure is released, the lips of the slit are brought back into engagement to close the aperture by the resiliency of the container walls and more particularly by that of the welded portion which extends close to the slit and has a greater inherent stiffness and restoring power than the remainder of the container. Preferably, the slit is formed immediately adjacent the weld, so that the welded margin of the container itself forms one lip of the slot. This welded margin, which may be either straight or waved, may be used for spreading the material extruded from the container.

For an understanding of the principles of the invention, reference is made to the following description of typical embodiments thereof as illustrated in the accompanying drawings. In the drawings:

Fig. 1 is an elevation view illustrating generally the method of filling and subdividing the tube into containers;

Fig. 2 illustrates a modification of the method shown in Fig. 1;

Fig. 3 is a partial elevation view illustrating the sealing off of a part of the tube during the formation of the subdividing heat seals;

Figs. 4 through 7 are bottom plan views of dies usable in performing the invention method;

Fig. 8 is a side elevation view of a preferred form of heat sealing die arrangement;

Fig. 9 is a similar view illustrating the interposed dielectric sheets or strips;

Fig. 10 is a plan view of a plurality of containers filled with pasty material and provided with discharge slits; and Fig. 11 is a sectional view through one of the containers of Fig. 10.

Referring to Fig. 1, in accordance with the invention, a flexible or rigid supply tube 10 has one end connected to a reservoir 11 containing a supply of the material with which the containers are to be filled. The other end of supply tube 10 is provided with a nozzle 12 having a relatively sealing fit within the flexible tube 15.

In performing the method, as described above, one end of tube 15 is sealed, as at 13, and the material from tube 10, being under pressure, forces tube 15 outwardly along tube 12 whereby individual seal welds 14 may be made in the tube at intervals dividing the tube transversely thereof into individual containers. Preferably, these containers are arranged in laterally divided relation as well as in longitudinally separated relation. The welding is effected by upper die 16 and lower die 17 which form the heat seals.

Where the supply tube 10 is flexible, it may be coiled as shown in Fig. 2 and the tube 15 may be drawn over the convolutions of tube 10. In this case, the nozzle 12 is removed from tube 10 until such time as tube 15 has been drawn inwardly of tube 10 sufficiently to expose the discharge end of tube 10. Nozzle 12 is then affixed to tube 10 and tube 15 is pulled outwardly over nozzle 12 and its end is sealed as at 13 (Fig. 1). The operation then proceeds in the manner as previously described.

Preferably, and as shown in Fig. 3, during the formation of the heat seals, a portion of the tube is sealed off by non-sealing dies 18, 18.

Each heat sealing operation preferably divides the tube into two containers spaced laterally of the tube. In each case, and using the die shown in Fig. 4, the head 21 of the die seals a previously filled pair of containers and the stem 22 of the die subdivides the tube into two containers which are filled but not yet sealed off. In the next operation, head 21 of the die of Fig. 4 seals off the previously unsealed pair of containers.

While each transverse weld is made in a single step, it is preferred to have each longitudinal weld made in two steps. Thus, with the die of Fig. 5, a transverse weld across the full width of the tube is made by cross arm 23, and seals off a previously filled pair of containers. In addition, the cross arm 24 completes the longitudinal weld subdividing these containers and forms ½ of the next longitudinal weld.

Fig. 6 illustrates a die similar to that of Fig. 4 but arranged to subdivide the tube into three containers spaced side-by-side, and this die comprises a cross bar 26 having a length equal to the full width of tube 15 and arranged to seal off three already filled containers, and stems 27 arranged to laterally subdivide another set of three filled containers.

Fig. 7 shows a die similar to Fig. 4 but provided with side elements 28 so that the tube 10 may have seal welds formed along each edge simultaneously with formation of a transverse weld by head 21' and a longitudinal subdividing weld by stem 22'.

Preferably, the lower die 17 has a flat upper face and the upper die 16' has a rib 31 or the like providing a thinned portion by means of which the containers may be relatively easily severed from each other. This arrangement is shown in Fig. 8.

Fig. 9 shows the dies of Fig. 8 as used with di-electric strips 32 unwound from reels and interposed between the die faces and tube 15.

Fig. 10 shows the plurality of containers 20' formed with slits 33 by means of which the contents may be discharged by pressure on the individual containers. Fig. 11 shows a cross section of such a container.

While specific embodiments of the invention have been shown and described in detail to illustrate the application of the invention principles, it will be understood that the invention may be otherwise embodied without departing from such principles.

What I claim is:

1. A process for producing sealed containers filled with fluid material, comprising the steps of threading an elongated tube of flexible thermoplastic material, having a closed end, over a similarly elongated supply tube; supplying fluid material under pressure through the supply tube to a portion of the thermoplastic tube downstream of the delivery end of the supply tube to cause the thermoplastic tube to move outwardly along the supply tube; temporarily clamping the walls of the filled portion of the thermoplastic tube together at a point intermediate the closed end and the delivery end of the supply tube to isolate a filled length of the thermoplastic tube, upstream of the closed end, from the supply of fluid under pressure; sealing off the filled portion at a point intermediate the closed end and the clamping point; releasing the clamping pressure to refill the length of the thermoplastic tube between the seal and the delivery end of the supply tube, and to cause the thermoplastic tube to move further outwardly along the supply tube; temporarily clamping together the walls of the newly filled portion of the thermoplastic tube at a point intermediate the seal and the delivery end of the supply tube to isolate a filled length of the thermoplastic tube, upstream of the seal, from the supply of fluid under pressure; sealing off the newly filled portion of the thermoplastic tube at a point intermediate the last formed seal and the clamping point to form united individual sealed containers separated by a seal therebetween; releasing the clamping pressure to refill the thermoplastic tube between the newly formed seal and the delivery end of the supply tube and to cause the latter to move outwardly along the supply tube; and repeating such sequence to form filled, sealed and joined containers along the length of the thermoplastic tube.

2. A process in accordance with claim 1 in which the supply tube is of such cross-section as to pass easily through the thermoplastic tube, the entire length of which is first passed over the supply tube, after which a delivery nozzle which is a close fit within the thermoplastic tube is attached to the delivery end of the supply tube, the outer end of the thermoplastic tube is withdrawn over the nozzle and the tube is sealed close to the nozzle.

References Cited in the file of this patent

UNITED STATES PATENTS

| Number | Name | Date |
|---|---|---|
| 636,317 | Von Buhler | Nov. 7, 1899 |
| 1,686,787 | Bates | Oct. 9, 1928 |
| 1,927,404 | Jensen | Sept. 19, 1933 |
| 2,062,249 | Clearwater | Nov. 24, 1936 |
| 2,156,466 | Vogt | May 2, 1939 |
| 2,185,647 | Penn | Jan. 2, 1940 |
| 2,272,530 | Patterson | Feb. 10, 1942 |
| 2,430,995 | Roos | Nov. 18, 1947 |
| 2,469,975 | McCloy | May 10, 1949 |
| 2,525,651 | Clunan | Oct. 10, 1950 |
| 2,566,533 | Poux | Sept. 4, 1951 |
| 2,607,696 | Kunz | Aug. 19, 1952 |
| 2,613,488 | Attride | Oct. 14, 1952 |
| 2,656,658 | Grady | Oct. 27, 1953 |

FOREIGN PATENTS

| Number | Country | Date |
|---|---|---|
| 134,107 | Australia | Sept. 5, 1949 |